(12) United States Patent
Maresh et al.

(10) Patent No.: US 11,790,076 B2
(45) Date of Patent: Oct. 17, 2023

(54) VAULT PASSWORD CONTROLLER FOR REMOTE RESOURCE ACCESS AUTHENTICATION

(71) Applicant: International Business Machines Corporation, Armonk, NY (US)

(72) Inventors: Mark E. Maresh, Oro Valley, AZ (US); Michael J. Whitney, Cary, NC (US); Juan F. Vargas, Cary, NC (US); Erich Guenter, Hofheim (DE)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 17/337,513

(22) Filed: Jun. 3, 2021

(65) Prior Publication Data
US 2022/0391490 A1   Dec. 8, 2022

(51) Int. Cl.
*G06F 21/45* (2013.01)
*H04L 9/40* (2022.01)

(52) U.S. Cl.
CPC ............ *G06F 21/45* (2013.01); *H04L 63/083* (2013.01)

(58) Field of Classification Search
CPC ....... G06F 21/45; G06F 21/31; H04L 63/083; H04W 12/068
See application file for complete search history.

(56) References Cited

U.S. PATENT DOCUMENTS

| 7,395,341 B2 | 7/2008 | Nicodemus |
| 9,531,714 B2 | 12/2016 | Innes |
| 9,729,514 B2 | 8/2017 | Lemaster |

(Continued)

FOREIGN PATENT DOCUMENTS

EP   3153985 A1   4/2017

OTHER PUBLICATIONS

Higo et al., "Security Requirements for Store-on-Client and Verify-on-Server Secure Biometric Authentication," International Workshop on Emerging Technologies for Authorization and Authentication, Copyright Springer Nature Switzerland AG 2020, A. Saracino and P. Mori (Eds.): ETAA 2019, LNCS 11967, pp. 86-103, 2020, https://doi.org/10.1007/978-3-030-39749-4_6.

(Continued)

*Primary Examiner* — Nelson S. Giddins
(74) *Attorney, Agent, or Firm* — Aaron N. Pontikos

(57) ABSTRACT

A computer-implemented method for authenticating a request to access a remote resource includes identifying a request from a first device to access a resource located on a second device. The computer-implemented method further includes retrieving one or more encrypted passwords for authenticating access to the resource from a partition of a vault located on the first device. The computer-implemented method further includes comparing the one or more encrypted passwords retrieved from the partition of the vault located on the first device to one or more designated passwords stored on the second device. The computer-implemented method further includes granting the first device access to the resource located on the second device based, at least in part, on the one or more encrypted passwords retrieved from the partition of the vault located on the first device matching the one or more designated passwords stored on the second device.

20 Claims, 6 Drawing Sheets

(56) References Cited

U.S. PATENT DOCUMENTS

| | | |
|---|---|---|
| 10,122,709 B2 | 11/2018 | Momchilov |
| 2006/0242684 A1 | 10/2006 | Russell |
| 2011/0047606 A1* | 2/2011 | Blomquist .......... H04L 63/0815 |
| | | 726/7 |
| 2011/0238587 A1 | 9/2011 | Owens, Jr. |
| 2017/0118215 A1* | 4/2017 | Varadarajan ............ H04L 63/10 |
| 2017/0147825 A1 | 5/2017 | Barton |
| 2019/0166103 A1* | 5/2019 | Tobias .................... G06F 1/163 |

OTHER PUBLICATIONS

Marcu, Eusebiu, "Self-built grid", University Politehnica of Bucharest, Provided by Searcher in report dated Jan. 16, 2021, 10 pages.

Mell et al., "The NIST Definition of Cloud Computing", Recommendations of the National Institute of Standards and Technology, NIST Special Publication 800-145, Sep. 2011, 7 pages.

Takahashi et al., "Parameter Management Schemes for Cancelable Biometrics," 2011 IEEE Workshop on Computational Intelligence in Biometrics and Identity Management (CIBIM), IEEE, 2011, 7 pages.

* cited by examiner

VAULT PASSWORD CONTROLLER FOR REMOTE RESOURCE ACCESS AUTHENTICATION

BACKGROUND

The present invention relates generally to the field of authentication management, and more particularly to authentication management using password vaults.

Authentication is the process of verifying the identity of a person or device. A common example of an authentication method is entering an email address and password to log into an email account. Entering the correct login information lets the mail server know who you are and that it is actually you that is accessing the server. While a username/password combination is a common way to authenticate ones identify, may other types of authentication exist. For example, you may use a four or six digit passcode to unlock your phone.

While authentication helps to keep personal information private, it is not foolproof. For example, if someone knows your email address, he or she can gain access to your account by simply guessing your password. This is why is it is important to use uncommon, hard-to-guess passwords, that contain a mixture of uppercase and lowercase letters, numbers, and special characters. In order to provide an extra layer of security, the use of multi-factor authentication (i.e., two-factor authentication) can be used. Two-factor authentication typically requires a correct login password plus another form of verification. For example, if you enable two-factor authentication for access to your online bank account, you may be required to enter a temporary code sent to your mobile device or email account to complete the login process. This ensures that only you (or someone with access to your mobile device or email account) can access your bank account, even after entering the correct login information.

A password vault or password manager is a software program that allows users to store, generate, and manage their passwords for multiple applications, online services, and resources in a secure location. A password manager assists in generating and retrieving complex passwords, storing such passwords in an encrypted database or calculating them on demand. Depending on the type of password manager used, the encrypted password vault for storing passwords is either stored locally on a user's device or stored remotely through an online file-hosting service. Typically, users can access the password vault via a single username and password. For example, a user may only be required to generate and remember a "master" password to unlock the password vault. Upon successfully unlocking the password vault, the user is provided with the password for a device, application, service, or resource that the user is trying to access.

SUMMARY

According to one embodiment of the present invention, a computer-implemented method for authenticating a request to access a remote resource is disclosed. The computer-implemented method includes identifying a request from a first device to access a resource located on a second device. The computer-implemented method further includes retrieving one or more encrypted passwords for authenticating access to the resource from a partition of a vault located on the first device. The computer-implemented method further includes comparing the one or more encrypted passwords retrieved from the partition of the vault located on the first device to one or more designated passwords stored on the second device. The computer-implemented method further includes granting the first device access to the resource located on the second device based, at least in part, on the one or more encrypted passwords retrieved from the partition of the vault located on the first device matching the one or more designated passwords stored on the second device.

According to another embodiment of the present invention, a computer program for authenticating a request to access a remote resource is disclosed. The computer program product includes one or more computer readable storage media, and program instructions stored on the one or more computer readable storage media. The program instructions include instructions to identify a request from a first device to access a resource located on a second device. The program instructions further includes instructions to retrieve one or more encrypted passwords for authenticating access to the resource from a partition of a vault located on the first device. The program instructions further include instructions to compare the one or more encrypted passwords retrieved from the partition of the vault located on the first device to one or more designated passwords stored on the second device. The program instructions further include instructions to grant the first device access to the resource located on the second device based, at least in part, on the one or more encrypted passwords retrieved from the partition of the vault located on the first device matching the one or more designated passwords stored on the second device.

According to another embodiment of the present invention, a computer system for authenticating a request to access a remote resource is disclosed. The computer system includes one or more computer processors, one or more computer readable storage media, and program instructions stored on the one or more computer readable storage media for execution by the one or more computer processors. The program instructions include instructions to identify a request from a first device to access a resource located on a second device. The program instructions further includes instructions to retrieve one or more encrypted passwords for authenticating access to the resource from a partition of a vault located on the first device. The program instructions further include instructions to compare the one or more encrypted passwords retrieved from the partition of the vault located on the first device to one or more designated passwords stored on the second device. The program instructions further include instructions to grant the first device access to the resource located on the second device based, at least in part, on the one or more encrypted passwords retrieved from the partition of the vault located on the first device matching the one or more designated passwords stored on the second device.

DETAILED DESCRIPTION

Figure 1:
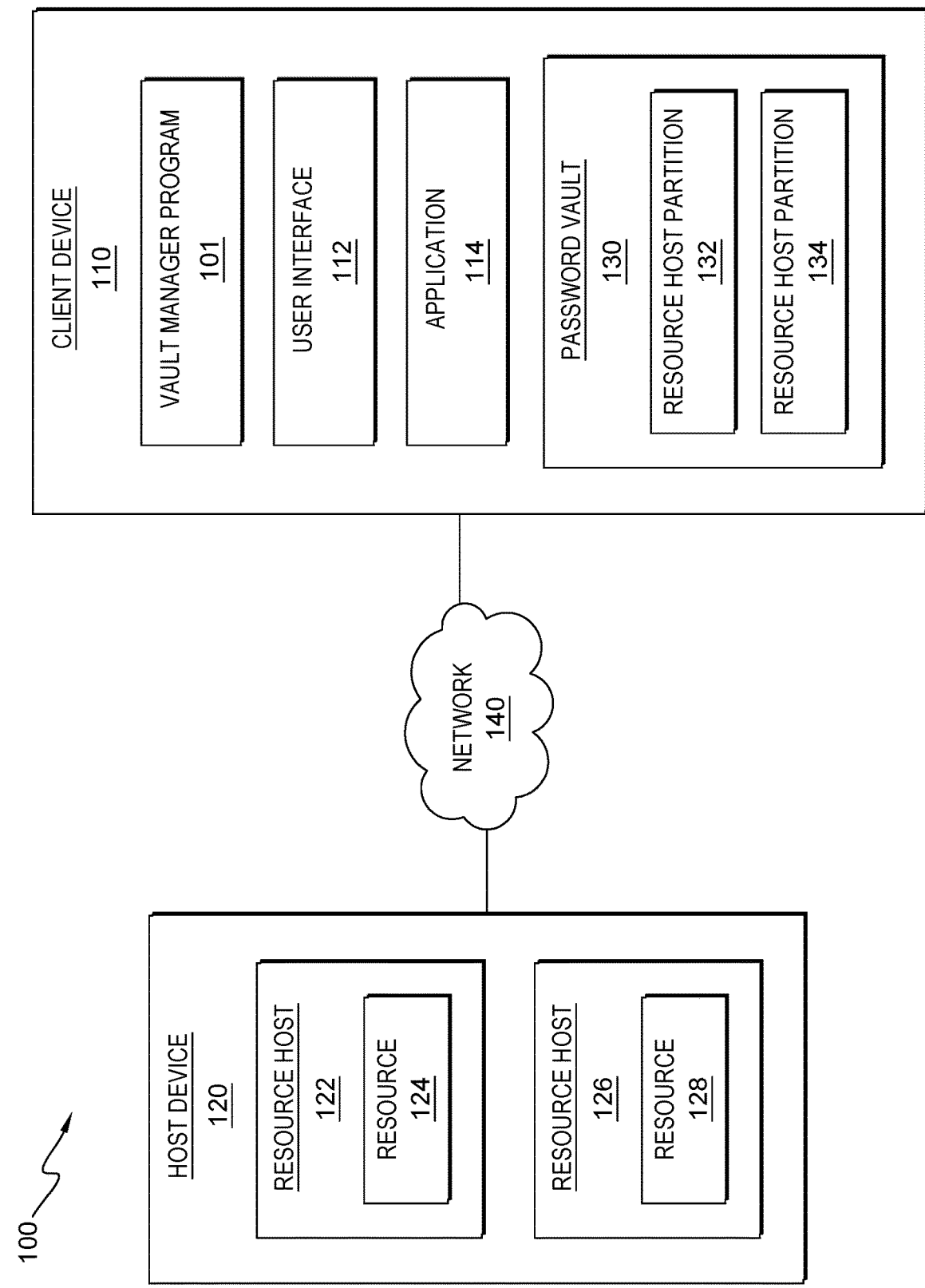
FIG. 1 is a functional block diagram of a network computing environment, generally designated 100, suitable for operation of a vault manager program 101 in accordance with at least one embodiment of the present invention.

Embodiments of the present invention are generally related to the field of authentication management, and more particularly to authentication management using password vaults.

Password vaults offer numerous advantages with respect to authentication management. Password vaults enable users to store longer, more secure passwords without the burden of having to remember each password and the particular password associated with an account. For example, an organization may require stricter password requirements, in which employees are required to have separate passwords for access to different resources, frequently change their passwords, use random characters, and increase the length of their passwords. Since these more complex passwords are harder to remember, all of the passwords can be stored in an encrypted, centralized password vault. Password managers can also be used as a defense against phishing by incorporating an automated login script that first compares the current site's URL to the stored site's URL. If the two do not match, then the password manager does not automatically fill in the login fields. This is intended as a safeguard against visual imitations and look-alike websites. Similarly, password managers can also protect against keystroke logging malware (i.e., keyloggers). For example, when using a multi-factor authentication password manager that automatically fills in login fields, the user does not have to type any user names or passwords that a keylogger may pick up.

However, embodiments of the present invention recognize that password vaults can also introduce numerous disadvantages. Some password managers use a user-selected master password or passphrase to form the key used to encrypt the passwords contained in the password vault. However, the security of this approach depends on the strength of the chosen password. Even if the password is fairly secure, the password may still be discoverable based on password spraying or brute-force attacks. Similarly, even a very secure password may still be discoverable if a user happens to also store the master password or passphrase locally where a malicious program or individual can read it. Since it is likely that a password vault contains a number of different passwords used to access various applications, user accounts, and secure resources, a compromised master password renders all of the protected passwords stored in the password vault vulnerable. Once a hacker obtains the master password, it is easy for them to remotely access a user's accounts.

Embodiments of the present invention improve upon the foregoing deficiencies of current password vaults by providing an adaptable, policy driven mechanism for authenticating a user or device via a novel password vault. In an embodiment, a separate vault is created and stored locally on each device, such as a smartphone, tablet, or laptop, that a user may use to access a resource. Each vault is divided into a plurality of partitions, in which each partition is associated with a particular resource host. Unlike current vaults in which user generated passwords are stored, the passwords stored in the respective partitions of the vault in accordance with embodiments of the present invention are encrypted and controlled by the resource hosts.

In an embodiment, a user initiates an authentication request by opening the password vault with their master PIN, password, or passphrase. Upon successfully opening the password vault, selection of a particular account associated with a resource host results in the resource host being prompted to initiate an authentication request for the user. Initiating the authentication request by the resource host includes selecting one or more passwords from a partition of the vault associated with the selected account based on a vault policy. In various embodiments, the vault policy is owned and controlled by the resource host and provides for which encrypted passwords should be selected from a vault partition in order to authenticate the user. The one or more encrypted passwords selected from a vault partition along with the user identification (ID) of the account stored in the vault is used to authenticate the user by comparing the selected encrypted passwords to a list of passwords authorized by the resource host. Upon successful authentication of the user, the user is granted access to the resource.

Accordingly, embodiments of the present invention may include one or more of the following features, characteristics, and/or advantages: (i) a hacker would need access to the vault in order to steal a password, which provides an extra layer of protection; (ii) a system in which account User IDs and passwords are controlled by the resource host and not the user; (iii) the use of long, secure passwords or a combination of secure passwords (of unlimited length) without having to remember or manually type any passwords that a keylogger may detect; (iv) authentication of user accounts in which the user does not know any of the passwords contained in the vault and thus, cannot accidently divulge passwords or inadvertently store unprotected passwords locally on their device; (v) an ability of the resource host to frequently and randomly change or disable the passwords stored in the vault to increase security without requiring any action on the part of the user; (vi) access to remote user accounts using passwords that are unique to the device that is used to access the account; (vii) a dynamic vault policy that allows for a different password or combination of passwords stored in the vault to be used for authenticating a user each time an authentication request is initiated; and (viii) a user generated vault PIN for use by a resource host to allow the resource host access to a partition in order to change, update, render inactive, or modify passwords and vault policies stored in a vault partition.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" and "dynamically" mean without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise, the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

As defined herein, a "resource" means any physical or virtual hardware, software, computer data, or information that can be accessed by an individual or device, such as client device 110.

As defined herein, a "resource host" means any physical or virtual computer connected to a computer network that offers access to resources to other individuals or devices connected to the computer network.

The terms first, second, etc. may be used herein to describe various elements. These elements should not be limited by these terms, as these terms are only used to distinguish one element from another unless stated otherwise or the context clearly indicates otherwise.

Referring now to various embodiments of the invention in more detail, FIG. 1 is a functional block diagram of a network computing environment, generally designated 100, suitable for operation of a vault manager program 101 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes client device 110, host device 120, and password vault 130 interconnected over network 140. In various embodiments of the present invention, network 140 can be a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video information. In general, network 140 may be any combination of connections and protocols that will support communications between client device 110, host device 120, password vault 130, and other computing devices (not shown) within network computing environment 100.

Client device 110 can represent a computing device of an end user, such as a mobile device, laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, client device 110 can represent any programmable electronic device or combination of programmable electronic devices capable of executing machine readable program instructions and communicating with host device 120, password vault 130, and other devices (not depicted) via a network, such as network 140. Client device 110 may include components, as depicted and described in further detail with respect to computing device 500 of FIG. 5, in accordance with embodiments of the present invention.

Client device 110 includes user interface 112 and application 114. User interface 112 is a program that provides an interface between a user of an end user device, such as client device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on client device 110. In an embodiment, application 114 can be an application that a user of client device 110 utilizes to gain access to one or more user accounts associated with a resource. For example, application 114 is a client-side application, such as a mobile banking application running on client device 110 that enables a user to access an online checking account. In another example, application 114 is a web application, such as a social media application running on a web browser that enables a user to access an online social media account. In an embodiment, application 114 may further include one or more components, such as add-ons or plug-ins installed on client device 110. In yet another example, application 114 can be representative of a resource host application that is integrated or embedded within an application for managing a password vault, such as password vault 130 located on client device 110.

Host device 120 is configured to provide resources to various computing devices, such as client device 110. For example, host device 120 may host various resources, such as web content, data storage, applications, and services that are accessed and utilized by a user of client device 110. In various embodiments, host device 120 is a computing device that can be a standalone device, a management server, a web server, an application server, a mobile device, or any other electronic device or computing system capable of receiving, sending, and processing data. In an embodiment, host device 120 represents a server computing system utilizing multiple computers as a server system, such as in a cloud computing environment. In an embodiment, host device 120 represents a computing system utilizing clustered computers and components (e.g. database server computer, application server computer, web server computer, webmail server computer, media server computer, etc.) that act as a single pool of seamless resources when accessed within network computing environment 100. In general, host device 120 represents any programmable electronic device or combination of programmable electronic devices capable of executing machine readable program instructions and communicating with each other, as well as with client device 110, password vault 130, and other computing devices (not shown) within network computing environment 100 via a network, such as network 140.

Figure 5:
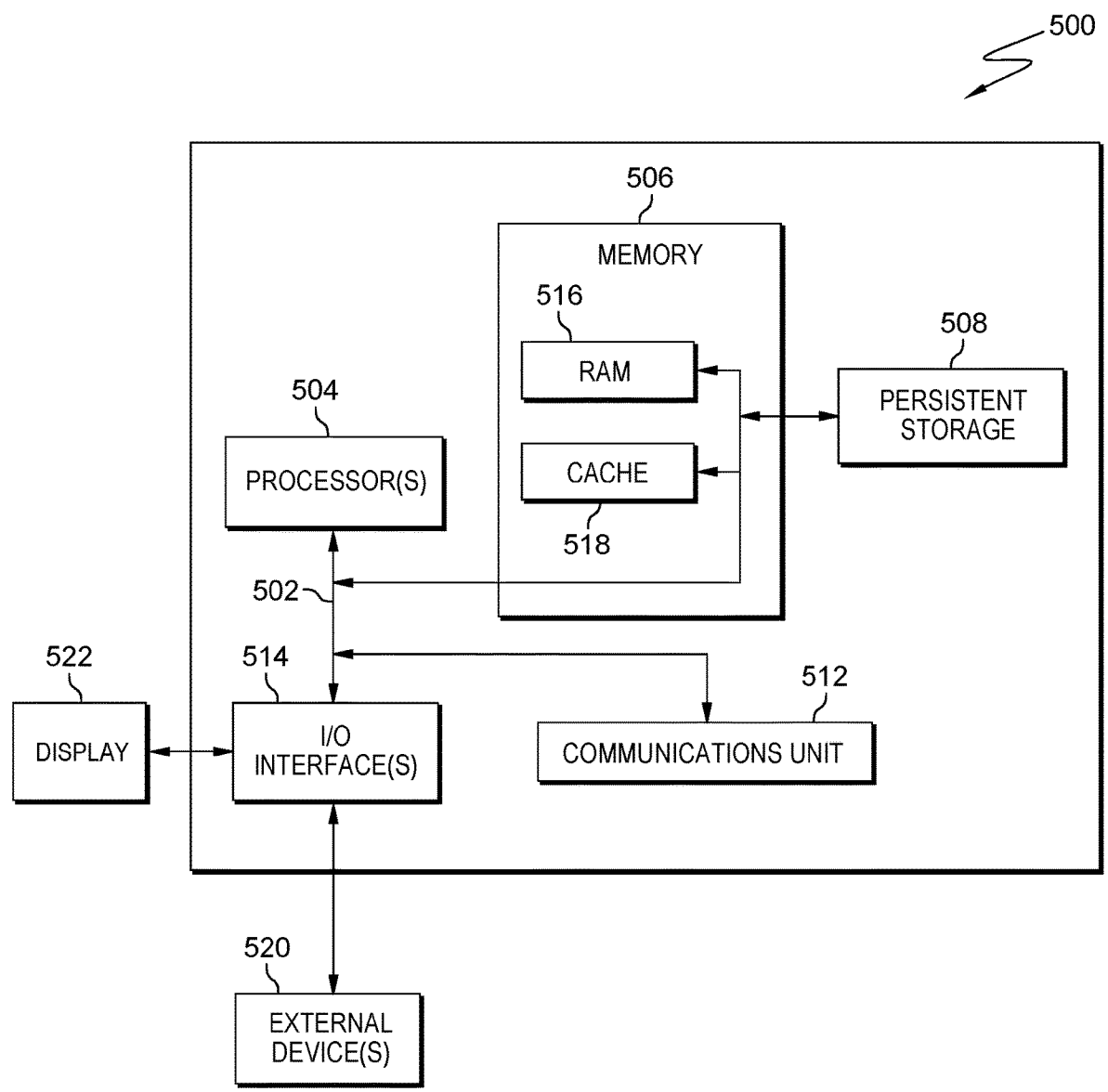
FIG. 5 is a block diagram depicting components of a computing device, generally designated 500, in accordance with at least one embodiment of the present invention.
Figure 6:
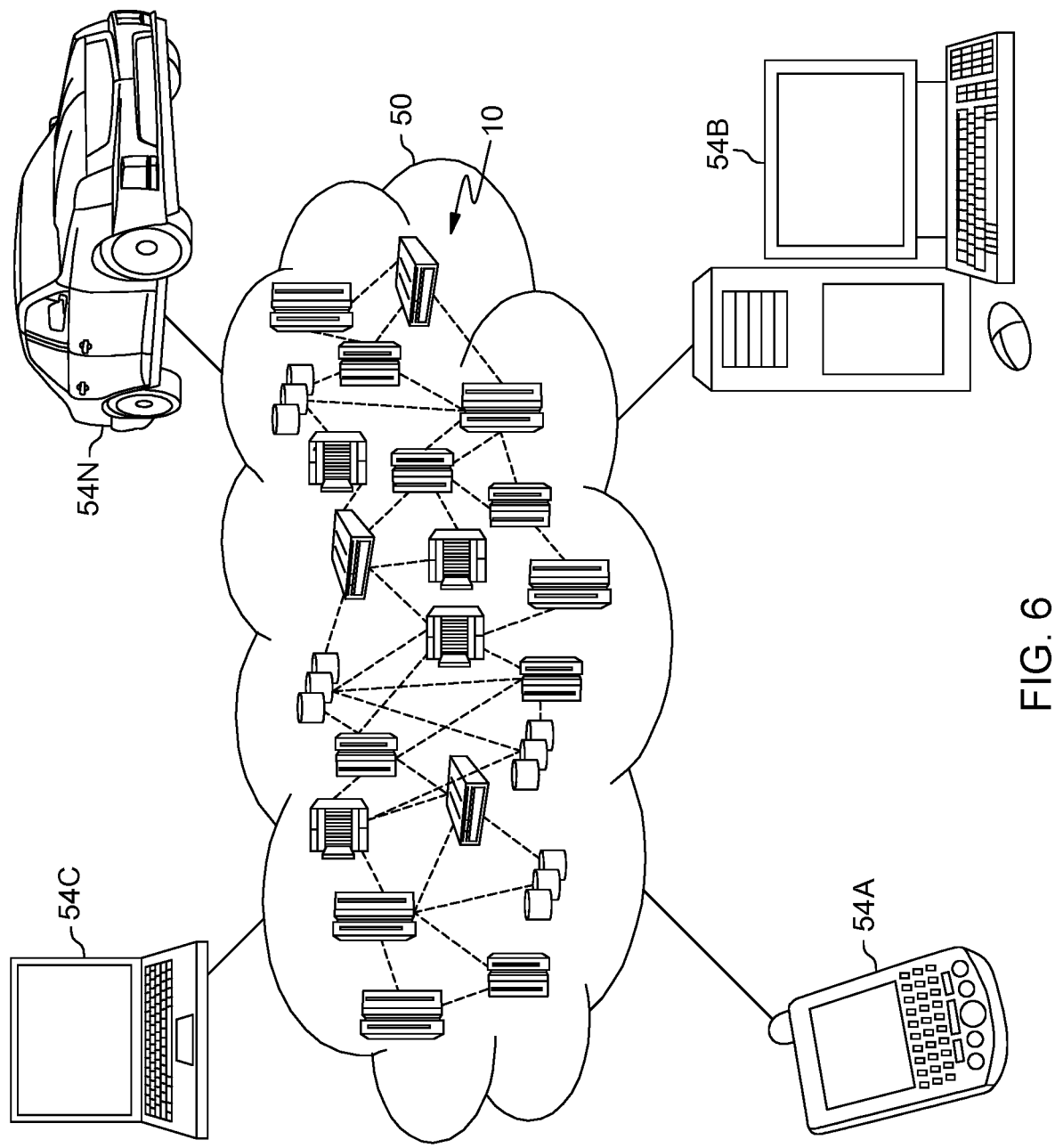
FIG. 6 is a block diagram depicting a cloud computing environment 50 in accordance with at least one embodiment of the present invention.

Host device 120 may include components as depicted and described in detail with respect to cloud computing node 10, as described in reference to FIG. 6, in accordance with at least one embodiment of the present invention. Host device 120 may include components, as depicted and described in detail with respect to computing device 500 of FIG. 5, in accordance with at least one embodiment of the present invention.

In various embodiments, host device 120 hosts resources, such as resource 124 and resource 128 associated with resource hosts 122 and 126, respectively. In an embodiment, a user or device, such as client device 110, requests access to a resource located on host device 120. For example, a resource may be computer hardware installed on host device 120. In another example, a resource may be computer software (e.g., an application) installed and running on host device 120. In yet another example, a resource may be computer data stored in a physical storage area of host device 120. In an embodiment, resource host 122 and resource host 124 are application service providers and resource 124 and resource 128 are applications installed and running on host device 120.

In an embodiment, a resource host stores passwords for accessing a resource located on a computing device or system associated with the resource host. In an embodiment, a resource host stores one or more passwords for accessing a resource on the same computing device in which the resource is located. For example, resource host 122 stores passwords for accessing resource 124 on host device 120. In an alternative embodiment, a resource host stores one or more passwords for accessing a resource on a different computing device than the computing device in which the resource is located. For example, resource host 126 stores passwords for accessing resource 128 on a different host device (not depicted) other than host device 120. In an embodiment, a resource host may store a single password, multiple passwords, and/or a combination of multiple passwords. In an embodiment, a resource host may further store the respective times and dates at which the passwords were stored.

In various embodiments, password vault 130 is a secure data repository for persistently storing encrypted passwords generated by resource for authenticating user access to a user account associated with a resource. Password vault 130 may be implemented using any volatile or non-volatile storage media known in the art for storing data. For example, password vault 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, password vault 130 may be implemented with any suitable storage architecture known in the art, such as a relational database, an object-oriented database, or one or more tables.

In an embodiment, a separate and distinct password vault 130 is associated with and stored locally on each client device 110 owned by a particular individual. For example, if a user owns a smartphone, a tablet, and a laptop, a separate password vault is locally located on each of these devices. In an embodiment, a user or device is granted access to password vault 130 by entering their User ID/Device ID and matching password or PIN. In an embodiment, a different User ID/Device ID and matching password or PIN is used to access each vault located on a respective client device 110 associated with a user. In an embodiment, the same User ID/Device ID and matching password or PIN is used to access any vault located on any client device 110 associated with a user.

In an embodiment, password vault 130 is divided into data partitions, wherein each respective data partition is associated with a particular resource host. For example, resource host 122 and resource host 126 may be associated with resource host partition 132 and resource host partition 134, respectively. In an embodiment, a user accesses a resource associated with a resource host by selecting a particular user account listed under a partition of password vault 130 associated with the resource host. For example, a corresponding URL to an email account associated with resource host 122 is connected to a user account listed under resource host partition 132 of password vault 130.

In an embodiment, passwords that are maintained in resource host partitions of password vault 130 are unique to the particular device in which password vault 130 is located. For example, assume that a first password vault is located on a smartphone of a user and a second password vault is located on a laptop of the user. The first password vault may include Partition A associated with Resource Host 1 and the second password vault may include Partition B, which is also associated with Resource Host 1. Although a user may request access to the same application (e.g., Application X) provided by Resource Host 1 via their smartphone or laptop, the passwords stored in Partition A that Resource Host 1 may use to authenticate a user attempting to access Application X from their smartphone are different than the passwords stored in Partition B that Resource Host 1 may use to authenticate the same user attempting to access Application X from their laptop.

As further depicted in FIG. 1, password vault 130 includes resource host partition 132 and resource host partition 134. Each of resource host partitions 132 and 134 include encrypted passwords generated by resource host 122 and resource host 126, respectively, for authenticating access to resource 124 and 128, respectively, via client device 110. It should be appreciated that any encrypted passwords stored in a resource host partition of password vault 130 are only accessible by the respective resource host who generated the passwords since the encryption key for decrypting the passwords stored in password vault 130 is not known by the owner of a device in which the password vault is located on.

In an embodiment, management of the passwords generated and stored in a resource host partition are controlled by the resource host associated with the partition. In an embodiment, a user of client device 110 generates a vault partition PIN for each partition of vault 130 that is used by the respective service provider associated with the partition to gain access to the partition. For example, a user may generate the vault partition PIN 123456 for use by resource host 122 to access resource host partition 132. In another example, a user may generate the vault partition PIN 654321 for use by resource host 126 to access resource host partition 134. In an embodiment, the vault partition PIN is only valid after a user request to access password vault 130 via client device 110 is authenticated. In an embodiment, the vault partition PIN is only valid after a user initiates an authentication request to access a resource based on a selection of a user account listed under a particular resource host partition of password vault 130. In an embodiment, the vault partition PIN is only valid for a predetermined period of time after a user initiates a request to access a resource associated with a resource host. It should be appreciated that since the passwords are generated and encrypted by the service providers, the user does not know what the passwords are, and thus cannot accidently divulge them. It should further be appreciated that since the resource hosts are in control of the passwords, the resource hosts can randomly generate passwords, as well as dynamically change or disable passwords stored in password vault 130 to increase security.

In an embodiment, each password vault and each resource host partition of a password vault is assigned a unique serial number that is associated with or tied to the MAC address of the device in which the password vault is located on. In an embodiment, access to a resource host partition of a password vault associated with a resource host is granted based on the resource host successfully presenting the following access credentials: (i) the serial number of the password vault, (ii) the serial number of the resource host partition of the password vault, (iii) the user assigned vault partition PIN, and (iv) the user ID of the user account in which the user is requesting access to. Accordingly, an initial user registration with each resource host may be required in order to provide the resource host with the necessary information required to access their respective resource host partition.

Network computing environment 100 further includes vault manager program 101. In various embodiments of the present invention, vault manager program 101 facilitates the storage, retrieval, and authentication of passwords stored in password vault 130. In an embodiment, vault manager program 101 controls access to password vault 130 by verifying an identity of a user or device requesting access to password vault 130. For example, vault manager program 101 authorizes access to password vault 130 based on authenticating a required username and password combination. Similarly, vault manager program 101 denies access to password vault 130 based on a failed authentication attempt using an incorrect username and password combination.

In an embodiment, a temporary communication channel is established between a resource host partition of a password vault located on a first device and a host device associated with the resource host partition in response to identifying a request from the first device to access a resource located on the second device. For example, a temporary communication channel is established between host partition 134 of password vault 130 and host device 120 in response to identifying a request from client device 110 to access a resource associated with resource host 126 located on host device 120.

In an embodiment, the temporary communication channel is maintained for a predetermined period of time. In an embodiment, the temporary communication channel is maintained for the duration of time in which the user or device has access to the resource. In an embodiment, a resource host may update the password(s) stored in a resource host partition of a password vault associated with the resource host while the communication channel is open. For example, resource host 122 can update passwords stored in resource host partition 132 of password vault 130 located on client device 110 during an active communication channel. In an embodiment, while the temporary communication channel is established between a resource host and password vault 130, the resource host can temporarily disable their respective resource host partition in order to prevent any further authentication requests from being made to the same resource in which a user of client device 110 is actively accessing.

In an embodiment, encrypted passwords stored in a resource host partition of a password vault can only be updated while a temporary communication channel is open between a resource host partition of a password vault and a computing device of the resource host associated with the resource host partition. For example, during a temporary communication channel established between resource host 122 and host partition 132 of password vault 130, vault manager program 101 stores one or more encrypted passwords in resource host partition 132 based on receiving one or more write operations from resource host 122 via the temporary communication channel. In an embodiment, encrypted passwords stored in a resource host partition of a password vault can only be deleted while a temporary communication channel is open between a resource host partition of a password vault and a computing device of the resource host associated with the resource host partition. For example, during a temporary communication channel established between resource host 126 and resource host partition 134 of password vault 130, vault manager program 101 deletes one or more encrypted passwords from resource host partition 134 based on receiving one or more delete operations from resource host 126 via the temporary communication channel.

In an embodiment, vault manager program 101 initiates an authentication request with a resource host in response to detecting a user request to access a resource located on host device 120. For example, vault manager program 101 may initiate an authentication request with resource host 122 based on detecting a user selection of a user account listed under resource host partition 132 of password vault 130. In another example, vault manager program 101 may initiate an authentication request with resource host 126 in response to a user of client device 110 successfully logging into password vault 130 and opening a client-based application associated with resource host 126 running on client device 110. In yet another example, vault manager program 101 may initiate an authentication request with resource host 126 in response to a user of client device 110 successfully logging into password vault 130 and opening a web application associated with resource host 126 via a web browser on client device 110.

In an embodiment, initiating an authentication request with a resource host includes prompting the resource host to enter its access credentials for accessing a resource host partition of a password vault located on the device in which the request to access a resource was generated. For example, if a user, via their smartphone, requests access to resource 124 associated with resource host 122, vault manager program 101 presents resource host 122 with a login mechanism to enter the necessary information required for resource host 124 to access resource host partition 132 of password vault 130 located on the user's smartphone.

In an embodiment, in response to validating the access credentials received by a resource host for accessing a resource host partition of password vault 130 located on client device 110, vault manager program 101 selects one or more encrypted passwords stored in the vault partition of password vault 130. In an embodiment, vault manager program 101 selects passwords based on a resource host password policy stored in resource host partition of password vault 130. As used herein, a resource host password policy is a set of rules that dictate which password(s) or combination of passwords stored in a resource host partition of password vault 130 should be selected for authentication of a user or device requesting access to a resource.

In an embodiment, vault manager program 101 compares the one or more encrypted passwords selected from a resource host partition based on the resource host password policy to one or more passwords stored on a computing device or system associated with the resource host. In an embodiment, vault manager program 101 may not have access to the passwords stored on the resource host computing system. Here, vault manager program 101 may retrieve passwords from a resource host partition of password vault 130 based on the resource host password policy stored in the resource host partition and send the retrieved passwords to the resource host for comparison. Based on the retrieved password(s) or password combination matching the password(s) stored on the resource hosts system and/or the retrieved password(s) matching the password(s) expected by the resource host, vault manager program 101 receives confirmation of the selected password(s) from the resource host.

In an embodiment, vault manager program 101 grants the user or device access to the resource in response to the one or more encrypted passwords selected from the resource host partition matching the one or more passwords stored locally on a computing device associated with the resource host. In an alternative embodiment, vault manager program 101 grants the user or device access to the resource in response to the one or more encrypted passwords selected form the resource host partition matching one or more designated passwords stored locally on a computing device associated with the resource host. For example, resource host 126 may have five passwords that are stored in resource host partition 134 of password vault 130 located on John's laptop and in a storage area located on host device 120. In this example, resource host 126 has designated Password 1 and Password 3 as the expected passwords that should be received from vault manager program 101 when John requests access to his work email account via his laptop. Accordingly, if vault password manager 101 sends Password 1 and Password 3 to resource host 126, vault password manager 101 grants John access to his work email account on his laptop in response to resource host 126 validating the passwords sent by password vault manager 101.

In another example, resource host 122 may have five passwords that are stored in resource host partition 132 of password vault 130 located on John's mobile device and in a storage area located on host device 120. In this example, resource host 122 has designated a concatenation of Password 2 and Password 4 as the expected password that should be received from vault manager program 101 when John requests access to his work email account via his mobile device. Accordingly, if vault password manager 101 sends Password 2 and Password 4 as a single text string to resource host 122, vault password manager 101 grants John access to his work email account on his mobile device in response to resource host 122 validating the concatenated password sent by password vault manager 101.

Figure 2:
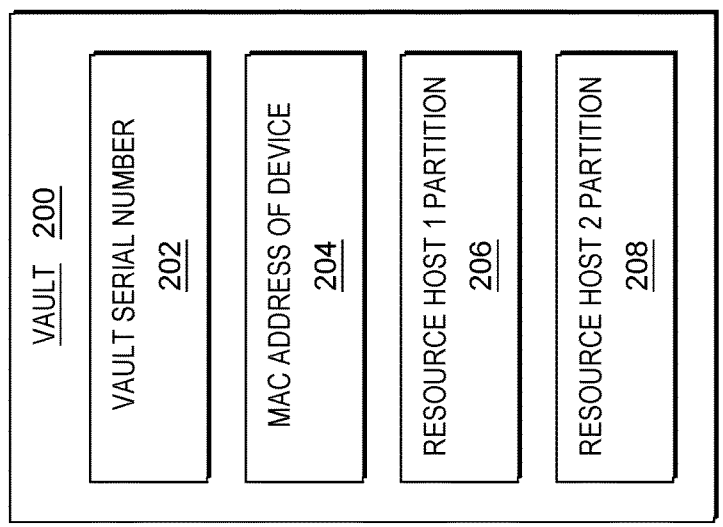
FIG. 2 is an exemplary block diagram depicting password vault 200 located on a computing device, such as client device 110 (depicted in FIG. 1), in accordance with at least one embodiment of the present invention.

FIG. 2 is an exemplary block diagram depicting a password vault 200 located on a computing device, such as client device 110 (depicted in FIG. 1), in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Password vault 200 includes vault serial number 202, MAC (media access control) address of device 204, resource host 1 partition 206, and resource host 2 partition 208. Vault serial number 202 is a unique serial number that is assigned to password vault 200. In an embodiment, vault serial number 202 is linked or mapped to MAC address 204 of a device in which password vault 200 is located on. For example, vault serial number 202 may be ABCD123 and MAC address 204 of the device that password vault 200 is located on may be 01-2F-56-A3-89-B2. One of ordinary skill in the art will appreciate that a MAC address is a unique hardware identifier assigned to a network interface controller (NIC) of a device that uniquely identifies each device on a network. Resource host 1 partition 206 and resource host 2 partition 208 are data partitions of password vault 200 that are associated with particular resource hosts. In an embodiment, resource host 1 partition 206 and resource host 2 partition 208 may each include one or more passwords and a corresponding password policy for selecting and authenticating passwords to access a resource provided by a host computing device, such as host device 120 (depicted in FIG. 1).

Figure 3:
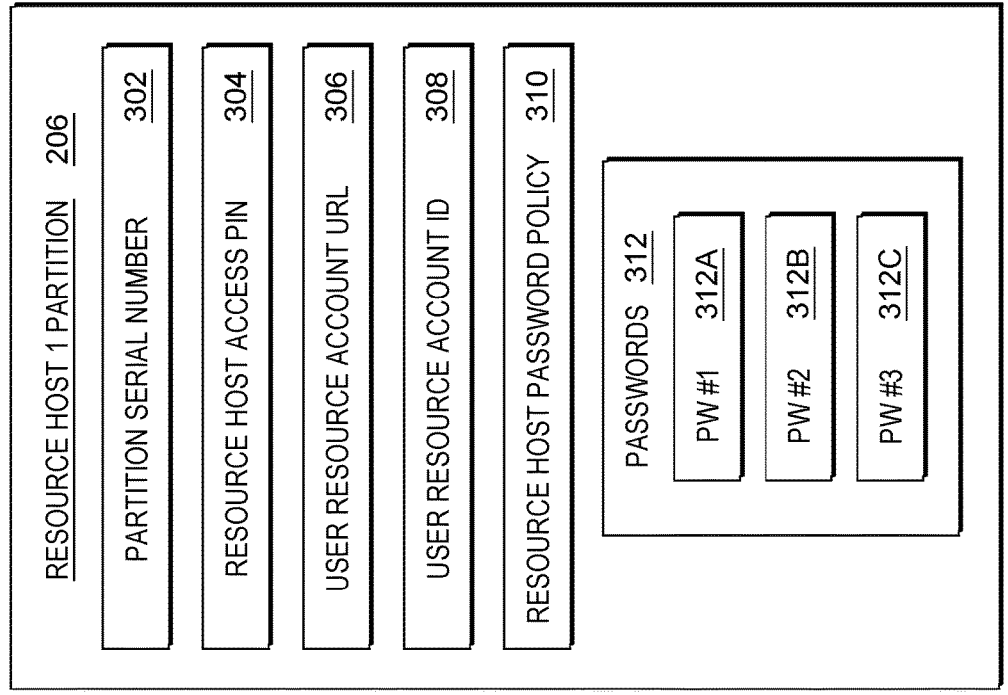
FIG. 3 is an exemplary block diagram, generally designated 300, depicting resource host 1 partition 206 of password vault 200 (depicted in FIG. 2) in accordance with at least one embodiment of the present invention.

FIG. 3 is an exemplary block diagram, generally designated 300, depicting resource host 1 partition 206 of password vault 200 (depicted in FIG. 2) in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Resource host 1 partition 206 includes partition serial number 302, resource host access pin 304, user resource account URL 306, user resource account ID 308, resource host password policy 310, and passwords 312, which further include PW #1 312A, PW #2 312B, and PW #3 312C. Partition serial number 302 is a unique identifier that is assigned to resource host 1 partition 206. For example, partition serial number 302 may be XYZ240. In an embodiment, each partition of a password vault is assigned a unique partition serial number.

Resource host access pin 304 is a unique pin for use by resource host 1 to gain access to resource host 1 partition 206. For example, resource host access pin 304 may be 3457. In an embodiment, resource host access pin 304 is assigned and controlled by a user of the device in which resource host 1 partition 206 of password vault 200 is located on. In an embodiment, resource host 1 utilizes resource host access pin 304 to establish a communication channel between password vault 200 located on a client device and a computing device associated with a resource host. In an embodiment, after being granted access to resource host 1 partition 206, resource host 1 can pull one or more password(s) stored in resource host 1 partition 206 of password vault 200. In an embodiment, resource host access pin 304 is only valid after a user initiates an authentication request for access to a resource via password vault 200. In an embodiment, resource host 1 can only access resource host 1 partition 206 to authenticate a user request to access a resource, update resource host password policy 310, and update passwords 312 stored in password vault 200. In an embodiment, resource host 1 can only update resource host password policy 310 and passwords 312 while an active user session is established between a user and a resource.

User resource account URL (uniform resource locator) 306 is a web address of a given resource, such as a user account. For example, user resource account URL 306 may be "https//www.myaccount.com," which is a web address for a user's email account. User resource account ID 308 is a username by which a person is identified by a resource host. For example, user resource account ID 308 may be "customerabc," which is used to identify a user's particular online bank account.

Resource host password policy 310 is owned and controlled by resource host 1, and provides for which encrypted passwords should be selected from resource host 1 partition 206 in order to authenticate a user requesting access to a resource. Passwords 312 for authenticating a user request to access a resource are stored in resource host 1 partition 206. For example, PW #1 312A may be "XC87YcP345jL!?98DGgP4," PW #2 312B may be "2-89TYYyp34?1!IopW234Uo," and PW #3 312C may be "3-U89Tyuv2jfkdjskaK07rtIP." If resource host password policy 310 is PW #1 312A+PW #3 312 C, then password vault manager 101 would combine PW #1 312A and PW #3 312 C to form the password "XC87YcP345jL!?98DGgP43—U89Tyuv2jfkdjskaK07rtIP" for the next authentication request by resource host 1.

Figure 4:
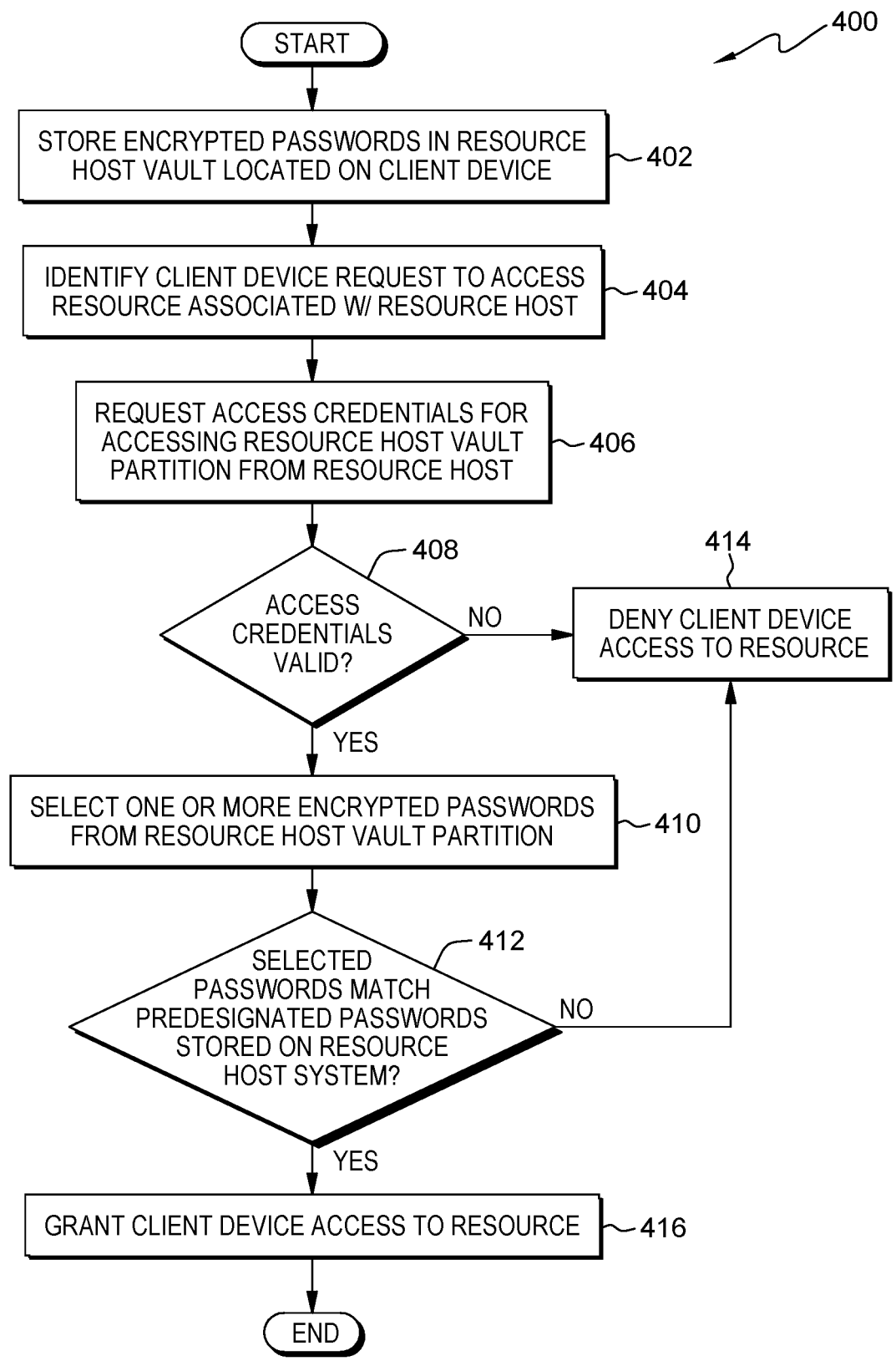
FIG. 4 is a flowchart diagram, generally designated 400, depicting operational steps for authenticating access to a resource by vault manager program 101 in accordance with at least one embodiment of the present invention.

FIG. 4 is a flowchart diagram, generally designated 400, depicting operational steps for authenticating access to a resource by vault manager program 101 in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

At step 402, vault manager program 101 stores one or more encrypted passwords associated with a resource located on a host device in a partition of a vault located on a client device. At step 404, vault manager program 101 identifies a request from the client device to access the resource located on the host device. At step 406, in response to identifying the request from the client device to access the resource located on the host device, vault manager program 101 prompts the host device to enter its access credentials for accessing the partition of the vault located on the client device.

At step 408, vault manager program 101 determines whether the access credentials entered by the host device for accessing the partition of the vault located on the client device are valid. In response to determining that the access credentials provided by the host device for accessing the partition of the vault located on the client device are valid (decision step 408 "YES" branch), vault manager program 101 proceeds to step 410. In response to determining that the access credentials provided by the host device for accessing the partition of the vault located on the client device are invalid (decision step 408 "NO" branch), vault manager program 101 proceeds to step 414 and denies the client device access to the resource located on the host device.

At step 410, in response to validating the access credentials provided by the host device for accessing the partition of the vault located on the client device, vault manager program 101 selects one or more encrypted passwords stored in the partition of the vault located on the client device.

At decision step 412, vault manager program 101 determines whether the one or more encrypted passwords selected from the partition of the vault match one or more predesignated passwords stored locally on the host device. In response to determining that the one or more encrypted passwords selected from the partition of the vault match the one or more predesignated passwords stored locally on the host device (decision step 412 "YES" branch"), vault manager program 101 grants proceeds to step 416 and grants the client device access to the resource located on the host device. In response to determining that the one or more encrypted passwords selected from the partition of the vault do not match the one or more predesignated passwords stored locally on the host device (decision step 412 "NO" branch"), vault manager program 101 proceeds to step 414 and denies the client device access to the resource located on the host device.

Alternatively, at decision step 412, host device 120 determines whether the one or more encrypted passwords selected from the partition of the vault match one or more predesignated passwords stored locally on the host device. Here, vault manager program 101 transmits the one or more encrypted passwords selected from the partition of the vault to the host device for comparison with the one or more predesignated passwords stored locally on the host device. In response to receiving, from the host device, a confirmation that the one or more encrypted passwords transmitted to the host device match the one or more predesignated passwords stored locally on the host resource (decision step 412 "YES" branch), vault manager program 101 proceeds to step 416 and grants the client device access to the resource located on the host device. In response to receiving, from the host device, a statement that the one or more encrypted passwords transmitted to the host device do not match the one or more predesignated passwords stored locally on the host resource (decision step 412 "NO" branch), vault manager program 101 proceeds to step 414 and denies the client device access to the resource located on the host device.

FIG. 5 is a block diagram depicting components of a computing device, generally designated 500, suitable for executing vault manager program 101 in accordance with at least one embodiment of the invention. Computing device 500 includes one or more processor(s) 504 (including one or more computer processors), communications fabric 502, memory 506 including, RAM 516 and cache 518, persistent storage 508, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile one or more computer readable storage media.

Program instructions for vault manager program 101 can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 7:
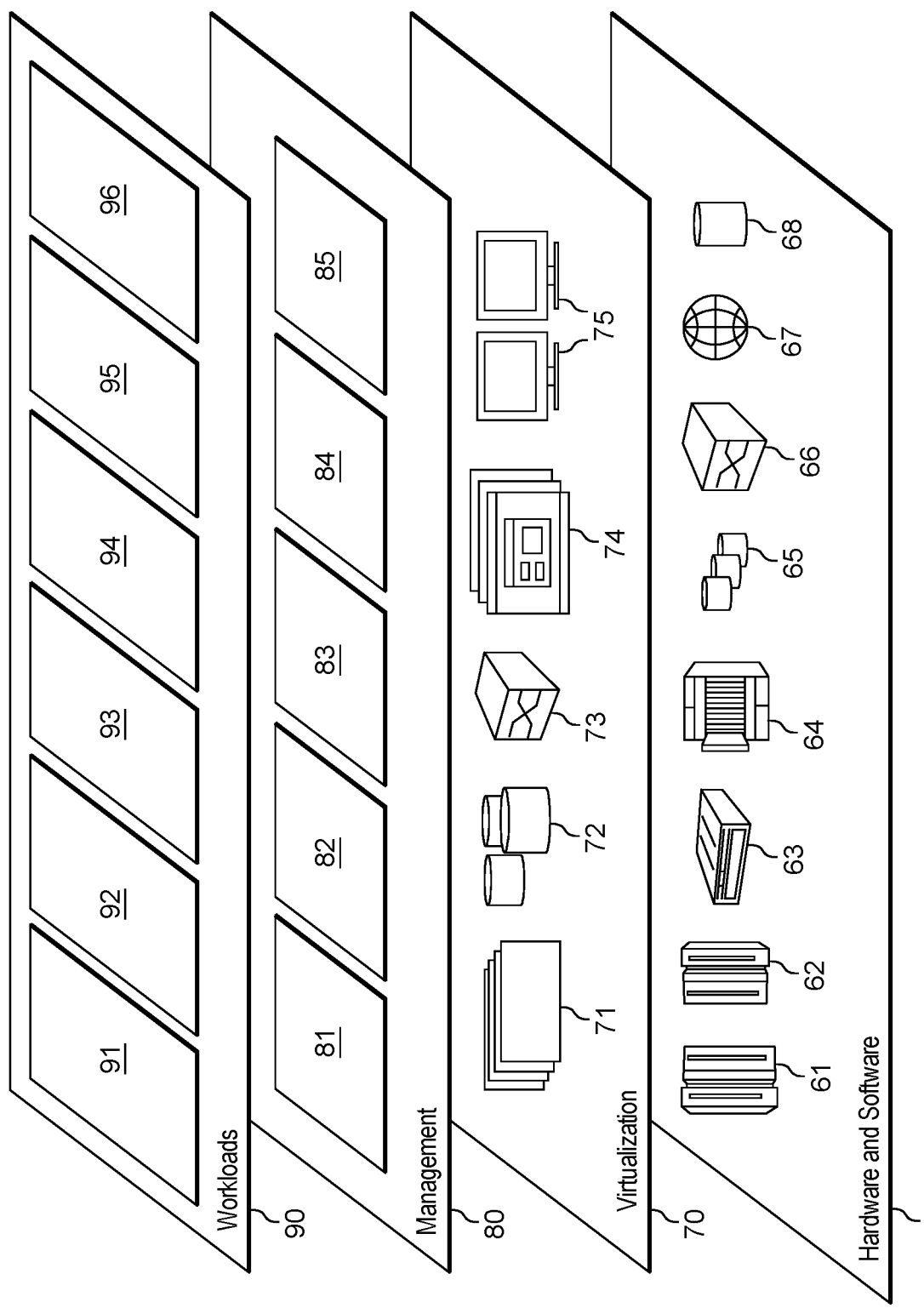
FIG. 7 is block diagram depicting a set of functional abstraction model layers provided by cloud computing environment 50 (depicted in FIG. 6) in accordance with at least one embodiment of the present invention.

FIG. 7 is block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and remote resource access authentication 96.

What is claimed is:

1. A computer-implemented method for authenticating a request to access a remote resource, comprising:
   identifying a request from a first device to access a resource located on a second device;
   retrieving one or more encrypted passwords for authenticating access to the resource from a partition of a vault located on the first device;

comparing the one or more encrypted passwords retrieved from the partition of the vault located on the first device to one or more designated passwords stored on the second device; and granting the first device access to the resource located on the second device based, at least in part, on the one or more encrypted passwords retrieved from the partition of the vault located on the first device matching the one or more designated passwords stored on the second device.

2. The computer-implemented method of claim 1, wherein retrieving the one or more encrypted passwords for authenticating access to the resource from the partition of the vault located on the first device is based, at least in part, on a password policy stored in the partition of the vault.

3. The computer-implemented method of claim 1, further comprising:

initiating, in response to identifying the request from the first device to access the resource located on the second device, an authentication request with the second computing device, wherein the authentication request includes prompting the second device to enter its access credentials for accessing the partition of the vault located on the first device.

4. The computer-implemented method of claim 2, wherein the access credentials for accessing the partition of the vault located on the first device include: a serial number of the vault, a serial number of the partition of the vault, a vault partition PIN, and a user ID of a user account associated with the resource.

5. The computer-implemented method of claim 1, further comprising:

establishing, in response to identifying the request from the first device to access the resource located on the second device, a temporary communication channel between the partition of the vault located on the first device and the second device.

6. The computer-implemented method of claim 5, further comprising:

receiving, while the temporary communication channel is open between the partition of the vault located on the first device and the second device, one or more write operations from the second device; and storing one or more passwords for authenticating access to the resource in the partition of the vault located on the first device.

7. The computer-implemented method of claim 1, further comprising:

receiving, while the temporary communication channel is open between the partition of the vault located on the first device and the second device, one or more delete operations from the second device; and deleting one or more passwords for authenticating access to the resource from the partition of the vault located on the first device.

8. A computer program product, comprising:
one or more computer readable storage media; and
program instructions stored on the one or more computer readable storage media, the program instructions comprising instructions to:

identify a request from a first device to access a resource located on a second device;

retrieve one or more encrypted passwords for authenticating access to the resource from a partition of a vault located on the first device;

compare the one or more encrypted passwords retrieved from the partition of the vault located on the first device to one or more designated passwords stored on the second device; and grant the first device access to the resource located on the second device based, at least in part, on the one or more encrypted passwords retrieved from the partition of the vault located on the first device matching the one or more designated passwords stored on the second device.

9. The computer program product of claim 8, wherein the instructions to retrieve the one or more encrypted passwords for authenticating access to the resource from the partition of the vault located on the first device is based, at least in part, on a password policy stored in the partition of the vault.

10. The computer program product of claim 8, further comprising instructions to:

initiate, in response to identifying the request from the first device to access the resource located on the second device, an authentication request with the second computing device, wherein the authentication request includes prompting the second device to enter its access credentials for accessing the partition of the vault located on the first device.

11. The computer program product of claim 10, wherein the access credentials for accessing the partition of the vault located on the first device include: a serial number of the vault, a serial number of the partition of the vault, a vault partition PIN, and a user ID of a user account associated with the resource.

12. The computer program product of claim 8, further comprising instructions to:

establish, in response to identifying the request from the first device to access the resource located on the second device, a temporary communication channel between the partition of the vault located on the first device and the second device.

13. The computer program product of claim 12, further comprising instructions to:

receive, while the temporary communication channel is open between the partition of the vault located on the first device and the second device, one or more write operations from the second device; and store one or more passwords for authenticating access to the resource in the partition of the vault located on the first device.

14. The computer program product of claim 12, further comprising instructions to:

receive, while the temporary communication channel is open between the partition of the vault located on the first device and the second device, one or more delete operations from the second device; and delete one or more passwords for authenticating access to the resource from the partition of the vault located on the first device.

15. A computer system, the computer system comprising:
one or more computer processors;
one or more computer readable storage media; and
program instructions, the program instructions being stored on the one or more computer readable storage media for execution by the one or more computer processors, the program instructions comprising instructions to:

identify a request from a first device to access a resource located on a second device;

retrieve one or more encrypted passwords for authenticating access to the resource from a partition of a vault located on the first device;

compare the one or more encrypted passwords retrieved from the partition of the vault located on the first device to one or more designated passwords stored on the second device; and grant the first device access to the resource located on the second device based, at least in part, on the one or more encrypted passwords retrieved from the partition of the vault located on the first device matching the one or more designated passwords stored on the second device.

16. The computer system of claim 15, wherein the instructions to retrieve the one or more encrypted passwords for authenticating access to the resource from the partition of the vault located on the first device is based, at least in part, on a password policy stored in the partition of the vault.

17. The computer system of claim 15, further comprising instructions to:

initiate, in response to identifying the request from the first device to access the resource located on the second device, an authentication request with the second computing device, wherein the authentication request includes prompting the second device to enter its access credentials for accessing the partition of the vault located on the first device.

18. The computer system of claim 15, further comprising instructions to:

receive, while the temporary communication channel is open between the partition of the vault located on the first device and the second device, one or more write operations from the second device; and store one or more passwords for authenticating access to the resource in the partition of the vault located on the first device.

19. The computer system of claim 15, further comprising instructions to:

receive, while the temporary communication channel is open between the partition of the vault located on the first device and the second device, one or more write operations from the second device; and store one or more passwords for authenticating access to the resource in the partition of the vault located on the first device.

20. The computer system of claim 15, further comprising instructions to:

receive, while the temporary communication channel is open between the partition of the vault located on the first device and the second device, one or more delete operations from the second device; and delete one or more passwords for authenticating access to the resource from the partition of the vault located on the first device.

* * * * *